United States Patent
Filippini et al.

(10) Patent No.: US 9,479,766 B2
(45) Date of Patent: Oct. 25, 2016

(54) MODIFYING IMAGES FOR A 3-DIMENSIONAL DISPLAY MODE

(75) Inventors: Gianluca Filippini, Los Gatos, CA (US); Bernd Weber, Sunnyvale, CA (US); James F. Dougherty, Morgan Hill, CA (US); Thomas J. Zato, Santa Clara, CA (US); Reinhard Steffens, Santa Clara, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 588 days.

(21) Appl. No.: 13/377,120

(22) PCT Filed: Jul. 9, 2010

(86) PCT No.: PCT/US2010/041580
§ 371 (c)(1),
(2), (4) Date: Dec. 8, 2011

(87) PCT Pub. No.: WO2011/006104
PCT Pub. Date: Jan. 13, 2011

(65) Prior Publication Data
US 2012/0098943 A1 Apr. 26, 2012

Related U.S. Application Data (60) Provisional application No. 61/224,724, filed on Jul. 10, 2009.

(51) Int. Cl.
*H04N 13/04* (2006.01)
*H04N 13/00* (2006.01)
*H04N 19/597* (2014.01)

(52) U.S. Cl.
CPC ........ *H04N 13/0456* (2013.01); *H04N 13/004* (2013.01); *H04N 13/007* (2013.01); *H04N 19/597* (2014.11)

(58) Field of Classification Search
CPC ..................... H04N 13/00; H04N 2013/0074; H04N 13/026; H04N 13/0221
USPC ..................................... 348/51, 42; 345/419
See application file for complete search history.

(56) References Cited

U.S. PATENT DOCUMENTS

| | | | |
|---|---|---|---|
| 5,615,046 A | 3/1997 | Gilchrist | |
| 7,015,920 B2 | 3/2006 | Ono | |

(Continued)

FOREIGN PATENT DOCUMENTS

| | | |
|---|---|---|
| EP | 1501316 | 1/2005 |
| WO | 2006018773 | 2/2006 |
| WO | 2008115222 | 9/2008 |

OTHER PUBLICATIONS

Office Action in the corresponding Chinese Application 201080030942.4, dated Nov. 1, 2013.

(Continued)

*Primary Examiner* — Hung Dang
*Assistant Examiner* — Girumsew Wendmagegn (57) ABSTRACT

Modifying images for a 3-dimensional display mode includes receiving a third image encoded for a 3-dimensional display mode, receiving a first image not encoded for the 3-dimensional display mode, modifying the first image to generate a second image encoded for the 3-dimensional display mode, and displaying the third image and the second image in the 3-dimensional display mode.

23 Claims, 8 Drawing Sheets

(56) References Cited

U.S. PATENT DOCUMENTS

| | | | |
|---|---|---|---|
| 7,046,270 B2 | 5/2006 | Murata et al. | |
| 2005/0248561 A1* | 11/2005 | Ito et al. | 345/419 |
| 2009/0315979 A1* | 12/2009 | Jung et al. | 348/43 |
| 2010/0039428 A1* | 2/2010 | Kim et al. | 345/419 |

OTHER PUBLICATIONS

Response to the first Office Action in the corresponding Chinese Application 201080030942.4, dated Nov. 1, 2013 dated Mar. 17, 2014.

Second Office Action in the corresponding Chinese Application 201080030942.4, dated Jun. 3, 2014.

Response to the second Office Action in the corresponding Chinese Application 201080030942.4, dated Aug. 17, 2014.

Final Rejection in the corresponding Chinese Application 201080030942.4, dated Sep. 3, 2014.

Request for Reexamination in the corresponding Chinese Application 201080030942.4, dated Dec. 18, 2014.

Notification of Reexamination issued by the Patent Reexamination Board dated Aug. 27, 2015.

Response to the Notification in the corresponding Chinese Application 201080030942.4, dated Oct. 10, 2015.

\* cited by examiner

MODIFYING IMAGES FOR A 3-DIMENSIONAL DISPLAY MODE

CROSS-REFERENCE TO RELATED APPLICATIONS

This application claims priority to U.S. Provisional Patent Application No. 61/224,724 filed Jul. 10, 2009, hereby incorporated by reference in its entirety.

TECHNOLOGY

The present invention relates generally to a 3-dimensional display mode. More specifically, embodiments of the present invention relate to modifying an image for a 3-dimensional display mode.

BACKGROUND

In general, a human eye perceives objects in 3 dimensions based on the slight difference in a right eye view and a left eye view. The illusion of depth can be created for a 2-dimensional image such as in a photograph or movie by providing one view of the image to one eye and a slightly different view of the image to the second eye.

Many 3-dimensional display techniques provide differing views of an image to different eyes. One or more techniques for providing differing views of an image require receiving images encoded for that technique. For example, a technique for a 3-dimensional display may require a side-by-side image as input. However, if an image that has not been encoded for 3-dimensional mode is provided as input for a 3-dimensional display, the image may not be properly displayed. For example, if a line of text that has not been encoded for a 3-dimensional display mode is provided as input for a 3-dimensional display, the text appears distorted to a viewer viewing the text using the 3-dimensional display.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

The example embodiments described herein relate to modifying images for displaying in a 3-dimensional mode. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Example embodiments are described herein according to the following outline:

1.0 General Overview
2.0 Architectural Overview
3.0 Functional Overview
4.0 Side-By-Side 3-Dimensional Display Mode Example
5.0 Implementation Mechanisms—Hardware Overview
6.0 Equivalents, Extensions, Alternatives, and Miscellaneous

1.0 General Overview

In an embodiment, a first image encoded for a 3-dimensional display mode and a second image that is not encoded for the 3-dimensional display mode may be received. The first image and the second image may be received from different sources. The second image may be detected as not being encoded for the 3-dimensional display mode based on a comparison of different portions of the second image.

In an embodiment, the second image may be modified to generate a third image encoded for the 3-dimensional display mode. The second image may be modified to generate the third image based on information associated with the encoding of the first image or 3-dimensional display mode information.

In an embodiment, the first image and the third image may be displayed in the 3-dimensional display mode. Displaying the first image and third image may involve displaying at least a portion of the first image and a portion of the third image concurrently. One image of the first image and the third image may be overlaid on the other image of the first image and the third image.

Other embodiments of the invention may include an apparatus or computer readable medium with functionality to execute the steps described above.

2.0 Architectural Overview

Images may be described herein with reference to one or more example media, including still images, video frames, slide shows, etc. The selection of an example medium in this description may be made for simplicity and concise unity and, unless expressly stated to the contrary, should not be construed as limiting an embodiment to a particular medium as embodiments of the present invention are well suited to function with any media content.

Figure 1:
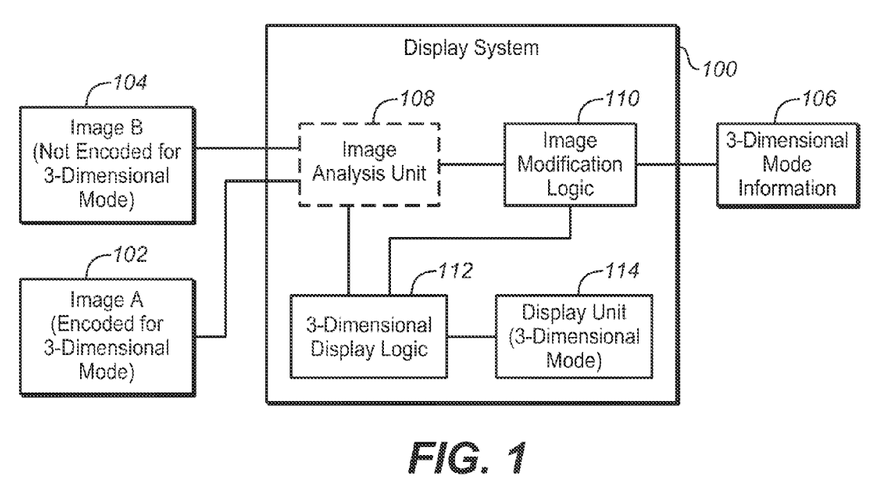
FIG. 1 depicts an example display system, according to one or more embodiments.

FIG. 1 shows an example of a display system (100) in accordance with one or more possible embodiments. In an embodiment, the display system (100) generally represents a single device or multiple devices that are configured to receive Image A (102) which is encoded for display in 3-dimensional mode and Image B (104) which is not encoded for display in a 3-dimensional mode.

Image A (102) generally represents any content (e.g., still image, video frame of a set of video frames, a slide from a slide show, a web page, web content, an interface, a desktop application view, a web based application view, an electronic programming guide, on screen display, etc.), which will properly be viewed in a 3-dimensional mode that the display system (100) is configured for. For example, image A (102) may be a single image made up of two side-by-side sub images, where the first sub-image and the second sub-image are similar. Image A (102) may also be one of an alternating sequence of images, where the images are intended for presentation to each eye, alternatively, by the display system (100).

Image B (104) generally represents any content (e.g., still image, video frame of a set of video frames, a slide from a slide show, a web page, web content, an interface, a desktop application view, a web based application view, an electronic programming guide, on screen display, etc.), which will not properly be viewed in the 3-dimensional mode that the display system (100) is configured for. For example, viewing image B (104) on the display system (100) may result in a distorted view of the image if the left half and the right half of image B are altogether different. For example, in a side by side 3-dimensional mode, the display system (100) may display a left half of image B (104) to the left eye and the right half of image B (104) to right eye, resulting in an unintended visual effect of layering the left half of image B (104) over the right half of image B (104). Although two input images are described for this example case, any number of images may be provided as input to the display system (100) for concurrent or sequential display.

In an embodiment, the 3-dimensional display mode information (106) generally represents any data associated with the current 3-dimensional display mode of the display system (100). The 3-dimensional display mode information may indicate the process performed on an image encoded for the 3-dimensional mode. For example, the 3-dimensional display mode information (106) may indicate that the left half of an image is to be used for display to a left eye and that a right half of an image is to be used for display to a right eye. In another example, the 3-dimensional display mode information (106) may indicate that alternate frames are to be displayed to the left eye and the right eye. In another example, the 3-dimensional display mode information (106) may indicate that the top half of an image is to be displayed to the left eye and the bottom half of an image is to be displayed to the right eye. The 3-dimensional display mode information (106) may correspond to information received by the display system (100), or stored on the display system (100). The 3-dimensional display mode information (106) may also correspond to information that is determined based on an analysis of an image (e.g., image A (102)) that is already encoded for display in the 3-dimensional mode.

As shown in FIG. 1, the display system (100) may include an image analysis unit (108), image modification logic (110), 3-dimensional display logic (112), and/or a display unit (114), in accordance with one or more embodiments. Each of these components is described below and may be located on the same device (e.g., a server, mainframe, desktop PC, laptop, PDA, television, cable box, satellite box, kiosk, telephone, mobile phone, etc.) or may be located on separate devices communicatively coupled over a network (e.g., Internet, Intranet, Extranet, Local Area Network (LAN), Wide Area Network (WAN), etc.), with wire and/or wireless segments. In one or more embodiments, the display system (100) is implemented using a client-server topology. The display system (100) itself may be an enterprise application running on one or more servers, and in some embodiments could be a peer-to-peer system, or resident upon a single computing system. In addition, the display system (100) may be accessible from other machines using one or more interfaces, web portals, or any other tool. In one or more embodiments, the display system (100) is accessible over a network connection, such as the Internet, by one or more users. Information and/or services provided by the display system (100) may also be stored and accessed over the network connection.

In an embodiment, the image analysis unit (108) generally represents any hardware and/or software configured to determine whether an image (e.g., image B (104) or image A (102)) is encoded for a current 3-dimensional display mode of the display system (100). The image analysis unit (108) may determine whether an image is encoded for a current 3-dimensional display mode based on metadata associated with the image or based on an analysis of the image itself. The image analysis unit (108) may provide images that are encoded for the current 3-dimensional display mode of the display system (100) directly to the 3-dimensional display logic (112). However, if an image is determined not to be encoded for the current 3-dimensional display mode of the display system, the image analysis unit (108) may forward the image to the image modification logic (110) for correction. The image analysis unit (108) may include a demultiplexer which receives all images at a single input and distributes each image to a suitable component. In an embodiment, the image analysis unit (108) may not be necessary because images that are known to be encoded for the 3-dimensional display mode may directly be provided to the 3-dimensional display logic (112). Furthermore, images that are not encoded for the 3-dimensional display mode may directly be provided to the image modification logic (110). For example, all media content from a 3D video player may be provided directly to the 3-dimensional display logic (112) if the media content is known to be encoded for the 3-dimensional display mode. Further, a user interface from the 3D video player or other device (e.g., a television with a volume control interface) may be provided directly to the image modification logic (110) if the user interface is known not to be encoded for the 3-dimensional display mode. If an image (e.g., image B (104)) is created locally within the display system (100), (e.g., by the display unit (114) or the 3-dimensional display logic (112)), the encoding of the image (e.g., 2-dimensional or 3-dimensional) is inherently known. The image analysis unit (108) may use this inherent information to process and/or forward the image without any analysis of the image.

In an embodiment, the image modification logic (110) generally represents any hardware and/or software configured for modifying an image to obtain a new image which is encoded for a 3-dimensional display mode. The image modification logic (110) may modify an image (e.g., image B (104)) which is not encoded for a 3-dimensional display mode, to obtain a new image encoded for the 3-dimensional display mode, based on the 3-dimensional display mode information (106). For example, in view of the expected 3-dimensional displaying technique, the image modification logic (110) may modify an original image such that the resulting visualization of the modified image through the display system (100) will be appropriate. The image modification logic (110) may include functionality to re-order pixels in an image, remove pixels from an image, add pixels to an image, and/or combine pixels from different images. The image modification logic (110) may include functionality to provide the modified images to the 3-dimensional display logic (112).

In an embodiment, the display unit (114) corresponds to any device with a display screen configured to receive and display input from the 3-dimensional display logic (112). The display unit (114) may include a cathode ray tube, a liquid crystal display, a plasma display, or any other suitable display.

In an embodiment, the 3-dimensional display logic (112) generally represents any hardware and/or software that includes functionality to determine the output (e.g., the display) of the display unit (114). The 3-dimensional display logic (112) may be a part of the display unit (114) or maybe implemented as a separate component communicatively coupled to the display unit (114). The 3-dimensional display logic (112) may receive input from multiple sources. For example, the 3-dimensional display logic (112) may receive images from the image analysis unit (108), the image modification logic (110), or any other suitable source (internal or external to the display system (100)). The 3-dimensional display logic (112) may combine multiple images for concurrently displaying the multiple images. For example, the 3-dimensional display logic (112) may combine images by overlaying one image on top of another image. The 3-dimensional display logic (112) may overlay images where at least a portion of each image is visible. For example, the 3-dimensional display logic (112) may receive a modified user interface in side-by-side format from the image modification logic (110), where the image modification logic (110) generated the side-by-side user interface from the original user interface that was not in a side-by-side format. The 3-dimensional display logic may then overlay this modified user interface in side-by-side format on top of an image from a 3D video source that was pre-encoded for the 3-dimensional display mode in the side-by-side format. The 3-dimensional display logic may include the functionality to overlay the two side-by-side format images with or without transparency where the image on the bottom is visible or not visible through the top image, respectively. Accordingly, the display system (100) may receive and effectively combine a first image pre-encoded for the 3-dimensional display mode with another image (not previously encoded), which is encoded for the 3-dimensional display mode by the image modification logic (110).

In an embodiment, the 3-dimensional display logic (112) may receive a side-by-side image where each side is made up of different color layers. The 3-dimensional display logic may superimpose one half of a side-by-side image onto the other half of a side-by-side image to generate an anaglyph image and provide a stereoscopic 3-dimensional effect on the display unit (114) when viewed with 2 color glasses with chromatically opposite colors.

In an embodiment, the 3-dimensional display logic (112) may provide a set of frames intended for the left eye and a set of frames intended for the right eye in an alternating sequence for display in the display unit (114). The alternating frames may be viewed with LCD shutter glasses which alter viewing of the display unit (114) between the left eye and the right eye at the same rate at which the frames are refreshed. As a result, a viewer's eyes alternate in watching respective frames on the display unit (114).

3.0 Functional Overview

Figure 2A:
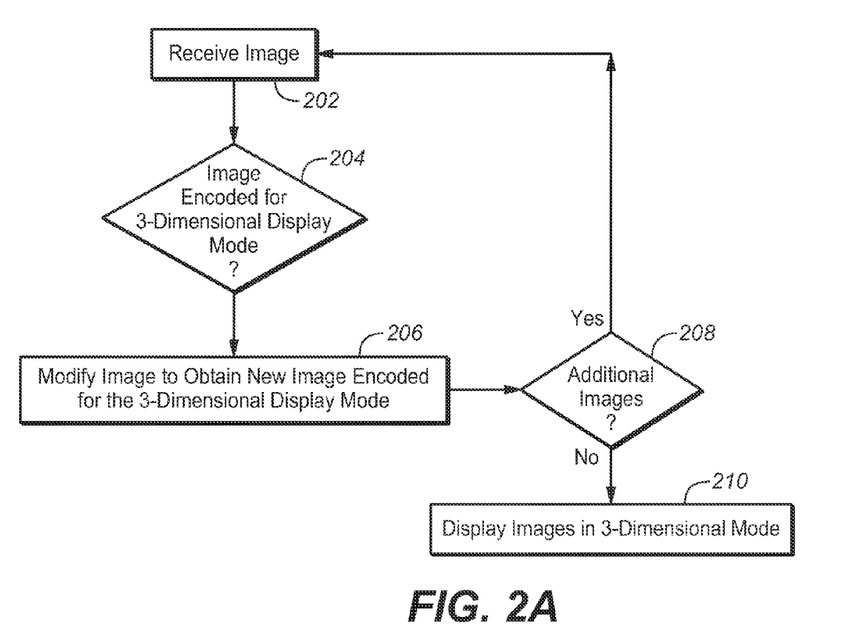
FIG. 2A depicts an example procedure for modification of an image for a 3-dimensional display mode, according to one or more embodiments.

FIG. 2A illustrates example embodiments for modifying images for displaying in 3-dimensional mode. One or more steps illustrated in FIG. 2A may be modified, rearranged, or omitted all together.

In an embodiment, an image is received (Step 202). The image may be received from one or more sources. For example, the image may be downloaded from the internet, received from a media content player, may be text or graphics read from a file, may be submitted by a user, may be received as an interface from a television, media content player or other device, may be media content received from a cable broadcaster or satellite dish, may be received from a gaming interface, may be input from a camera, or may be received from any other suitable source. Push and/or pull capabilities may be required for a display system receiving the image.

In an embodiment, a determination is made whether the image received is encoded for a 3-dimensional display mode (Step 204). The determination may be made based on the source of the image. For example, a 3D movie from a 3D movie player may be deemed to be encoded for a 3-dimensional display mode based on the source. Another example may involve a menu screen from the 3D movie player or a volume control on a television set which may both be deemed as not encoded for a 3-dimensional display mode based on the source. In an embodiment, a table may be maintained for all input sources indicating whether images from that source are encoded for a 3-dimensional display mode or not.

In an embodiment, an analysis of the image may be performed to determine whether the image is encoded for a 3-dimensional display mode. For example, based on a side-by-side 3-dimensional display mode, an expected pattern of similarity between the left and right halves of an encoded image may be identified. The expected pattern of an encoded image may then be compared to patterns detected within the input image. In this case if the left half of the input image is similar to the right half of the input image, then the input image matches the expected pattern of the side-by-side 3-dimensional display mode. The comparison of the left side of the input image and the right side of the input image may involve a pixel-by-pixel comparison. The comparison may also involve a region by region comparison or a determination whether one half is a shifted image of the other half. The comparison may involve deriving a fingerprint from each half and comparing the fingerprints to determine a degree of similarity. If the left side and the right side match a threshold level of similarity, then a determination is made that the image is encoded for a side-by-side 3-dimensional display mode. Another example involves comparison of pairs of consecutive frames to identify a degree of similarity. If pairs of consecutive frames match a threshold level of similarity, then the input image matches a alternate frame 3-dimensional display mode where each alternate frame is being displayed to different eyes of the viewer.

Figure 2B:
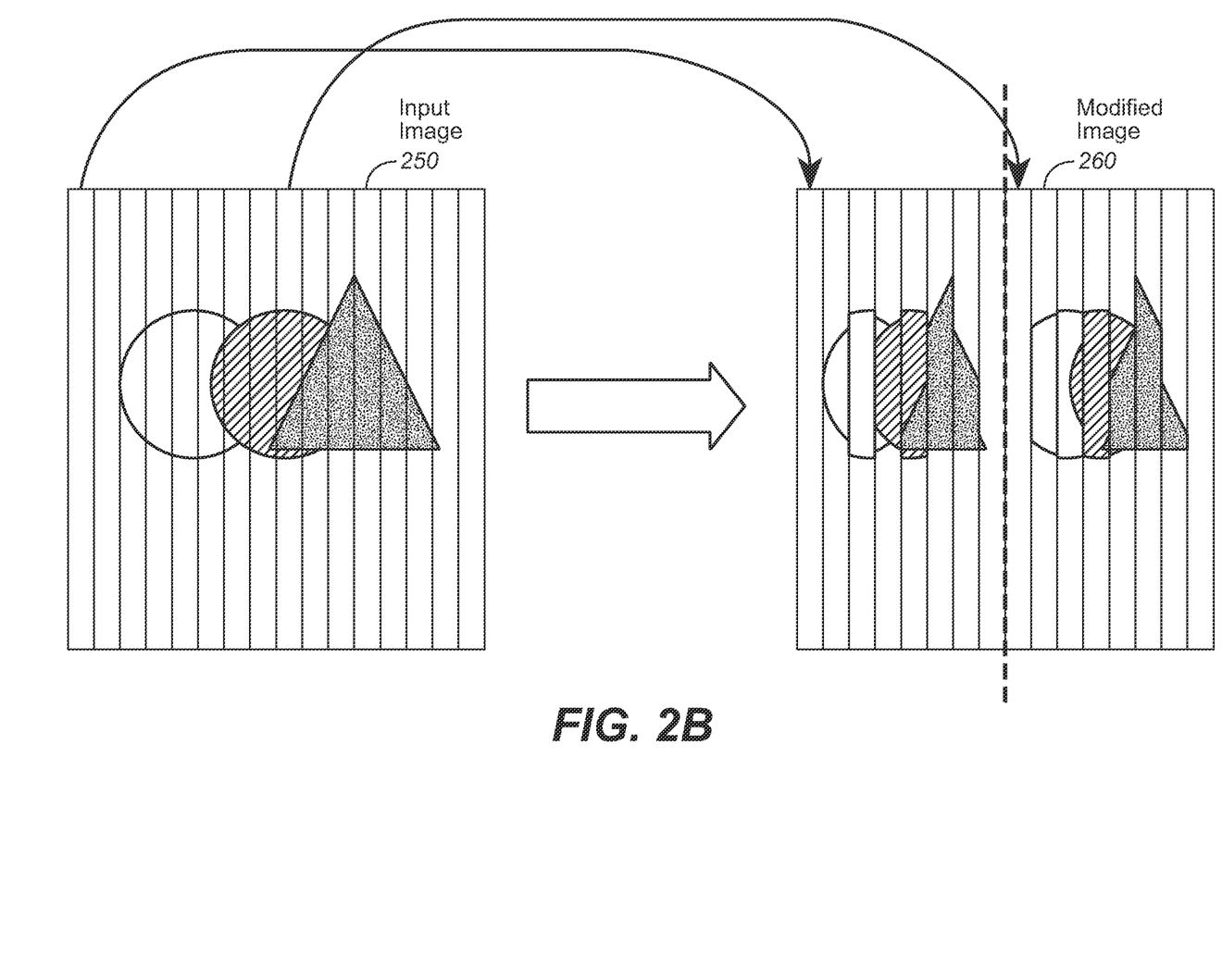
FIG. 2B depicts an example procedure for modification of an image for a 3-dimensional display mode, according to one or more embodiments.

In an embodiment, if the input image is not encoded for the 3-dimensional display mode, then the input image is modified to obtain a new image that is encoded for the 3-dimensional display mode (Step 206). Modification of the input image may involve removing pixels, adding pixels, modifying pixels, or rearranging pixels of the input image. In a side-by-side 3-dimensional display mode, columns or rows within the input image may be rearranged to obtain the modified image. For example, as shown in FIG. 2B, all of the odd columns of the original image (250) are used to generate the left half of the modified image (260) and all of the even columns of the original image (250) are used to generate the right half of the modified image (260). Wide columns are used in this example for illustrative purposes, however, any size columns may be used to implement this method. For example, each column width may be the width of a single pixel in the original image. In an embodiment, the columns may be used with spaces in between the columns. Additional examples for modifying an image are described below in relation with illustrations presented in FIG. 5A-FIG. 5C.

If additional images are received (Step 208), where the encoding of the image is not known the process may be repeated for modification of the images as needed. The images received either in pre-encoded format or modified to be encoded for the 3-dimensional display mode, may be displayed in the 3-dimensional mode (Step 210). Displaying in the 3-dimensional mode may involve special equipment as described above. In one or more embodiments, the resulting visualization for a viewer is a 3-dimensional illusion created using multiple 2-dimensional views. For example, the left image of a side-by-side image perceived by the left eye and the right image of a side-by-side image perceived by the right eye are fused to create an illusion of a three dimensional scene by the visual cortex of the brain. The illusion of the three dimensional scene may also be referred to as an integrated stereoscopic image.

4.0 Side-By-Side 3-Dimensional Display Mode Example

Figure 3:
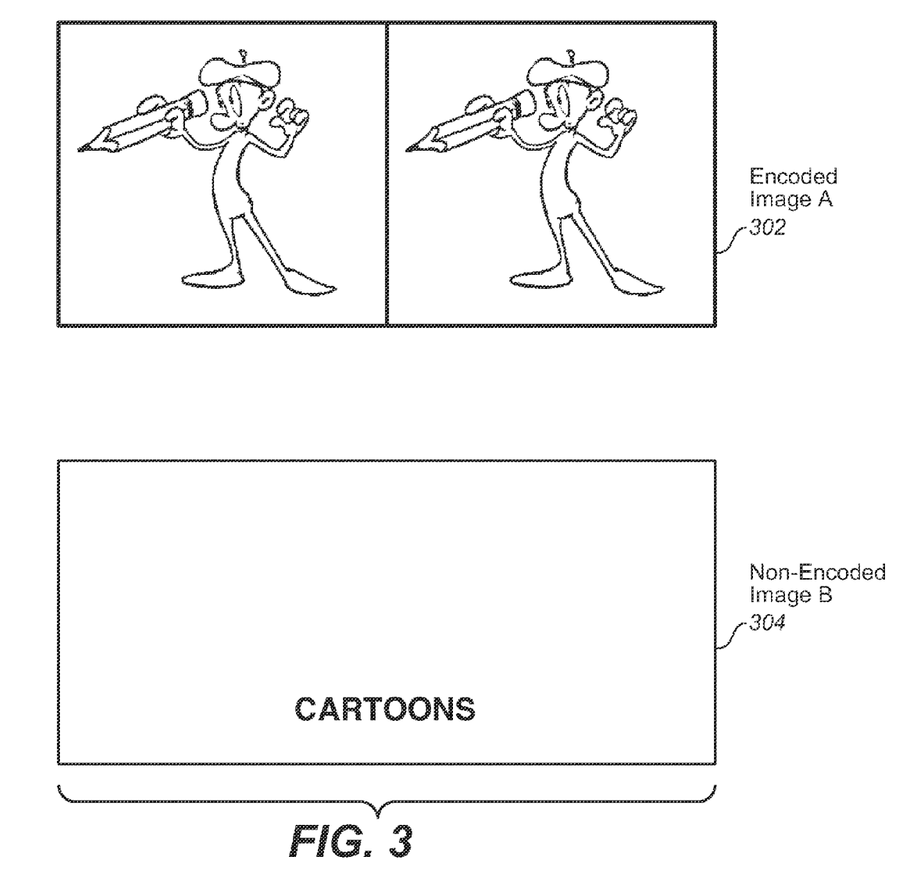
FIG. 3 depicts a set of example images that are provided as input to a display system, according to one or more embodiments.

FIG. 3 depicts a set of example images that are provided as input to a display system, according to one or more embodiments. Encoded Image A (302) is an image that is encoded for a side-by-side 3-dimensional display mode, evidenced by the fact that the left and right half of encoded image A (302) are similar. Accordingly, a view of the encoded image (302) through a 3-dimensional display mode would yield a proper image. However, the non-encoded image (304) is an image that is not suitable for a side-by-side 3-dimensional display mode since the left half and the right half of non-encoded image (304) are not similar.

Figure 4:
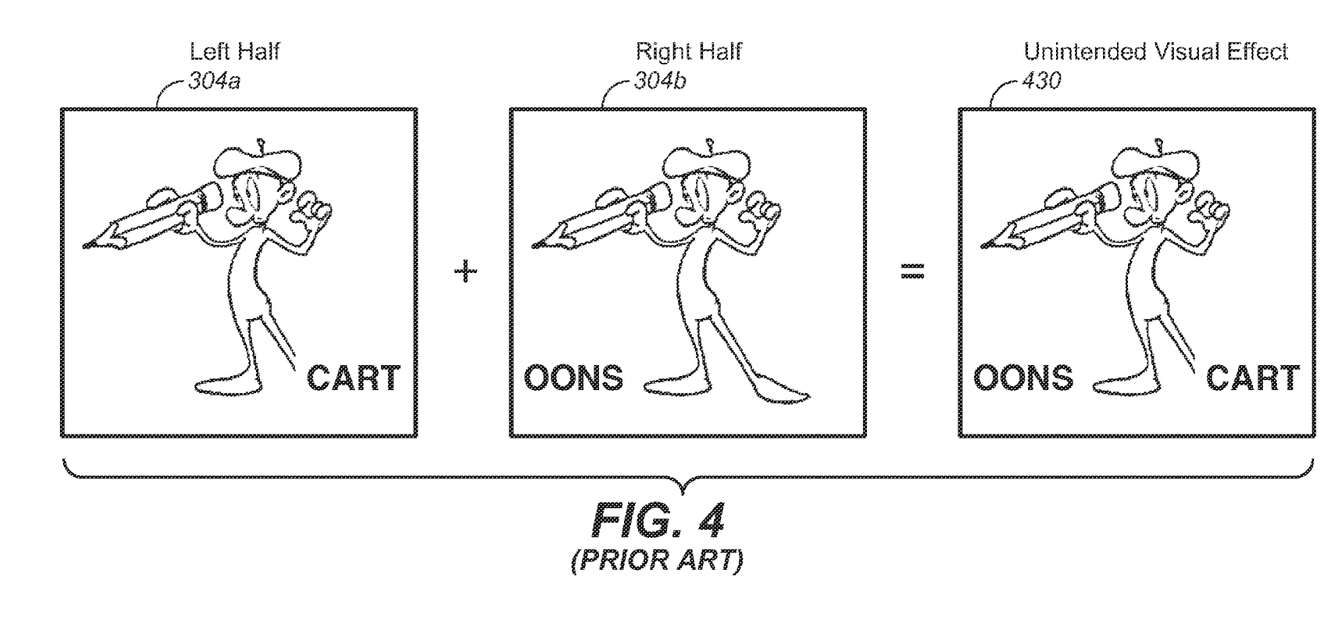
FIG. 4 depicts an example of an unintended visual result in 3-dimensional mode.

If the non-encoded image (304) is displayed in a side-by-side 3-dimensional display mode, the non-encoded image (304) becomes distorted, as shown in FIG. 4. Specifically when the non-encoded image (304) is layered on top of the encoded image (302), the left half (304a) of the combined image and the right half (304b) of the combined image, each include only a distorted portion of the original non-encoded image (304). When the left half (304a) and the right half (304b) of the combined image are displayed to a left eye and a right eye, the unintended visual effect (430) is created by the visual cortex of the brain which overlays one half on the other half.

Figure 5A:
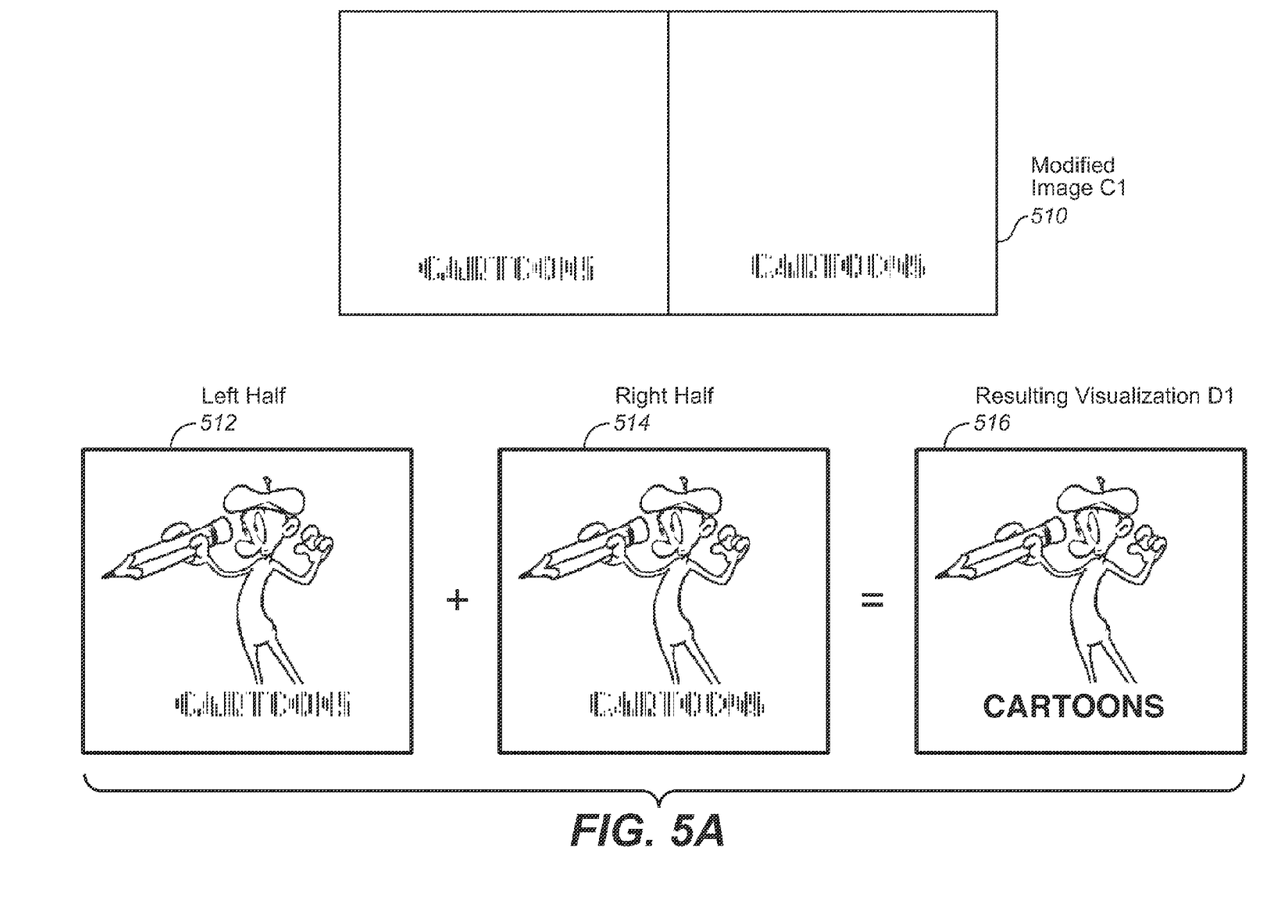
FIG. 5A-FIG. 5C depict examples of modified images and resulting visualizations in 3-dimensional mode, according to one or more embodiments.

FIG. 5A shows an example of modifying the non-encoded image (304) by taking alternate columns of the image for each side of the side-by-side image, similar to the illustration depicted in FIG. 2B, to obtain modified image C1 (510). However, in this example, spaces between the alternate columns are retained for each side of the modified image C1 (510). Thereafter, when the left half (512) of the combined image is combined with the right half (514) of the combined image, the resulting visualization D1 (516) includes "CARTOONS" as originally depicted in the non-encoded image (304).

Figure 5B:
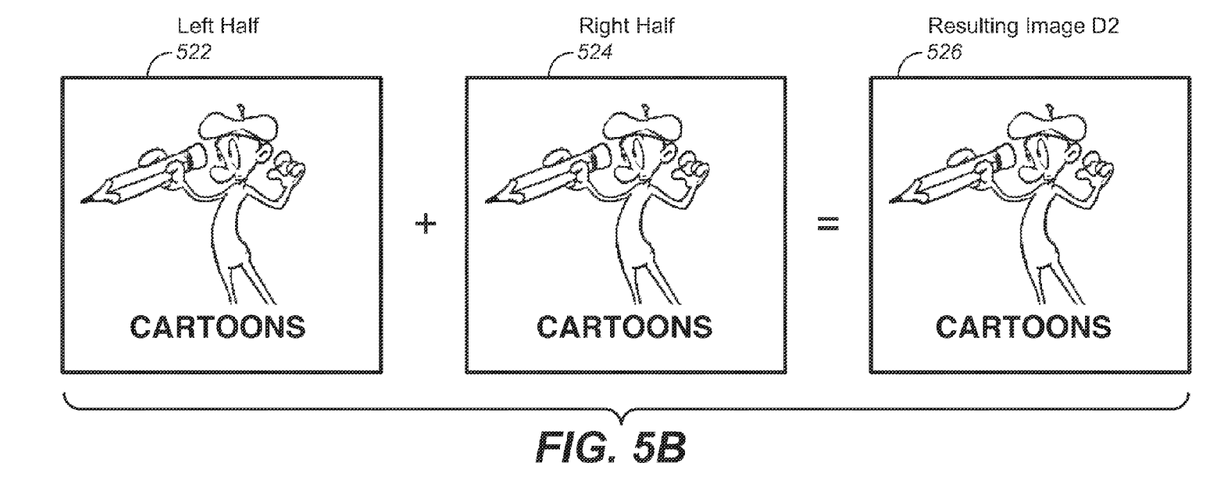

FIG. 5B shows an example of modifying the non-encoded image (304) by creating a side-by-side modified image C2 (520), where each side includes the all of the non-encoded image (304). Thereafter, when the left half (522) of the combined image is combined with the right half (524) of the combined image, the resulting visualization D2 (526) includes "CARTOONS" as originally depicted in the non-encoded image (304).

Figure 5C:
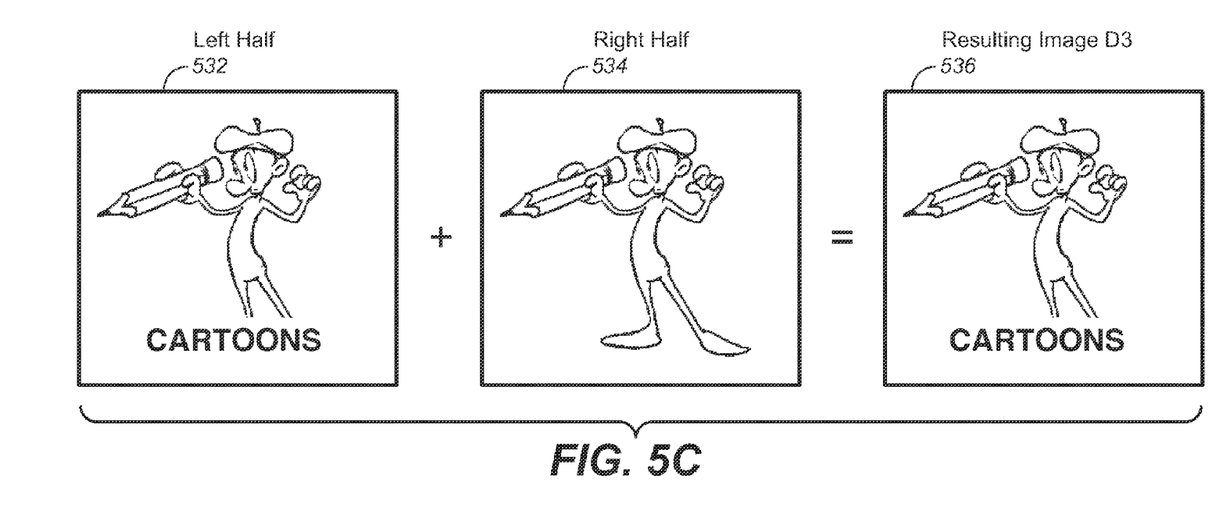

FIG. 5C shows an example of modifying the non-encoded image (304) by creating a side-by-side modified image C3 (530), where only the left side includes all of the non-encoded image (304). Thereafter, when the left half (532) of the combined image is combined with the right half (534) of the combined image, the resulting visualization D3 (536) includes "CARTOONS" as originally depicted in the non-encoded image (304).

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
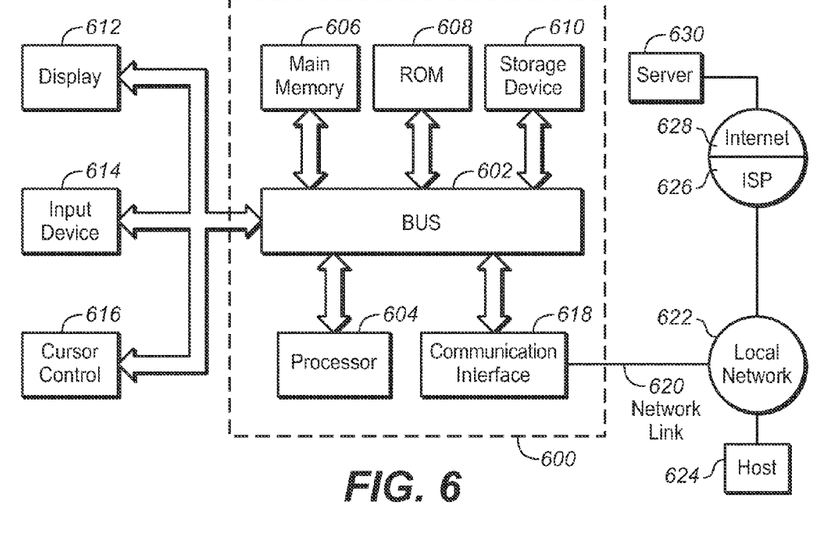
FIG. 6 depicts an example computer system platform, with which one or more embodiments may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

Figure 7:
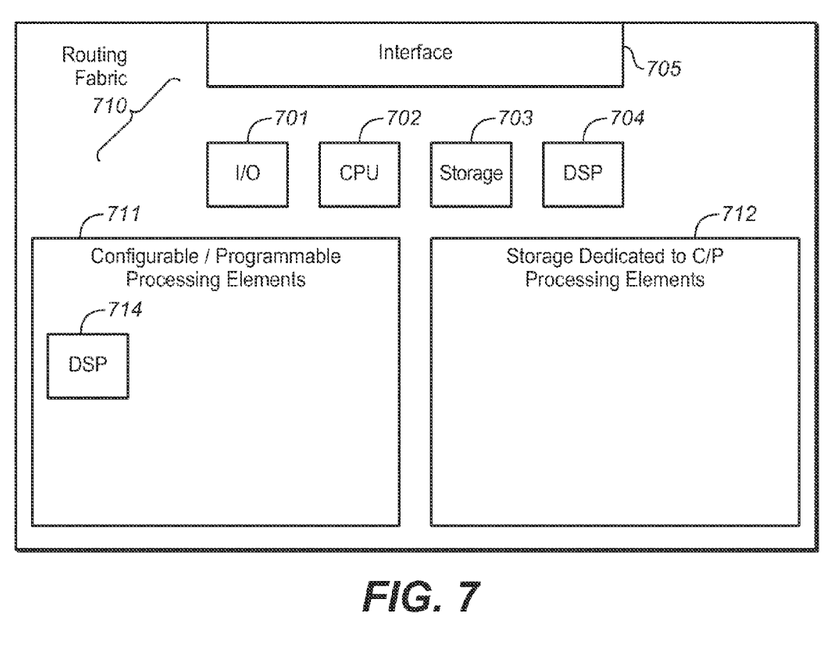
FIG. 7 depicts an example of integrated circuit, with which one or more embodiments may be implemented.

FIG. 7 depicts an example IC device 700, with which an embodiment of the present invention may be implemented. IC device 700 may have an input/output (I/O) feature 701. I/O feature 701 receives input signals and routes them via routing fabric 710 to a central processing unit (CPU) 702, which functions with storage 703. I/O feature 701 also receives output signals from other component features of IC device 700 and may control a part of the signal flow over routing fabric 710. A digital signal processing (DSP) feature performs at least function relating to digital signal processing. An interface 708 accesses external signals and routes them to I/O feature 701, and allows IC device 700 to export signals. Routing fabric 710 routes signals and power between the various component features of IC device 700.

Configurable and/or programmable processing elements (CPPE) 711, such as arrays of logic gates may perform dedicated functions of IC device 700, which in an embodiment may relate to deriving and processing media fingerprints that generally correspond to media content. Storage 712 dedicates sufficient memory cells for CPPE 711 to function efficiently. CPPE may include one or more dedicated DSP features 714.

6.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method, comprising:
receiving a first image for display in a 3-dimensional display mode, wherein the first image is not encoded for the 3-dimensional display mode;
receiving a third image for display in the 3-dimensional display mode, wherein the third image is encoded for the 3-dimensional display mode, and where the third image comprises a set of side-by-side images further comprising a right view image and a left view image and further wherein the first image is to be merged with the third image to result in a 3-dimensional composite image;
detecting that the first image has not been encoded for the 3-dimensional display mode based on an analysis of the first image, wherein the detecting that the first image has not been encoded for the 3-dimensional mode comprises comparing two different portions of the first image and determining a degree of similarity between the two different portions of the first image;
detecting that the third image has been encoded for the 3-dimensional display mode based on an analysis of the third image, wherein the analysis of the third image generates 3-dimensional display mode information;
modifying the first image to generate a second image encoded for the 3-dimensional display mode, wherein the second image comprises a right view image and a left view image that, when composed with the third image, renders a 3-dimensional image substantially depicting the 2-dimensional first image in 3-dimensions, and wherein the modifying the first image to generate the second image is responsive to the detecting that the first image has not been encoded for the 3-dimensional display mode and is based on the 3-dimensional display mode information; and
displaying the second image in the 3-dimensional display mode;
wherein the method is performed by one or more devices that comprise a processor.

2. A method comprising:
receiving a first image for display in 3-dimensional display mode, wherein the first image is not encoded for the 3-dimensional display mode;
receiving a third image for display in the 3-dimensional display mode, wherein the third image has been encoded for the 3-dimensional display mode, and where the third image comprises a set of side-by-side images further comprising a right view image and a left view image and further wherein the first image is to be merged with the third image to result in a 3-dimensional composite image;
detecting that the first image has not been encoded for the 3-dimensional display mode based on an analysis of the first image;
modifying the first image to generate a second image encoded for the 3-dimensional display mode, wherein the second image comprises a right view image and a left view image that, when composed with the third image, renders a 3-dimensional image substantially depicting the 2-dimensional first image in 3-dimensions, and wherein the modifying the first image to generate the second image is responsive to the detecting that the first image has not been encoded for the 3-dimensional display mode and is based on 3-dimensional display mode information associated with the third image; and
displaying the second image in the 3-dimensional display mode;
wherein the method is performed by one or more devices comprising a processor.

3. The method as recited in claim 2, further comprising displaying the third image in the 3-dimensional display mode.

4. The method as recited in claim 3, wherein at least a portion of the second image and at least a portion of the third image are displayed concurrently.

5. The method as recited in claim 4, wherein displaying the second image and the third image in the 3-dimensional display mode comprises overlaying the second image over the third image.

6. The method as recited in claim 2, wherein the first image and the third image are received from two different sources.

7. The method as recited in claim 2, further comprising, subsequent to the modifying of the first image, combining the second image and the third image based on the 3-dimensional display mode information to obtain a combined image, wherein the displaying comprises displaying the combined image.

8. The method as recited in claim 2, wherein the first image is modified to generate the second image encoded for the 3-dimensional display mode based on 3-dimensional display mode information that is obtained from an analysis of the third image.

9. The method as recited in claim 2, wherein the 3-dimensional display mode comprises a side-by-side display mode.

10. The method as recited in claim 2, wherein a left half of the second image is similar to a right half of the second image.

11. The method as recited in claim 2, wherein a left half of the second image is identical to a right half of the second image.

12. The method as recited in claim 2, wherein modifying the first image to generate the second image encoded for the 3-dimensional display mode comprises re-arranging pixels in the first image to obtain the second image.

13. The method as recited in claim 2, wherein a left portion of the second image comprises pixels in an even position on a horizontal axis in the first image, and wherein a right portion of the second image comprises pixels in an odd position on the horizontal axis in the first image.

14. The method as recited in claim 2, wherein a top half of the second image comprises pixels in an even position on a vertical axis in the first image, and wherein a bottom half of the second image comprises pixels in an odd position on the vertical axis in the first image.

15. The method as recited in claim 2, wherein the second image comprises a portion of pixels in the first image.

16. The method as recited in claim 2, wherein detecting that the first image has not been encoded for the 3-dimensional mode comprises comparing two different portions of the first image and determining a degree of similarity between the two different portions of the first image.

17. The method as recited in claim 16, wherein the two different portions of the first image comprise two corresponding halves of the first image.

18. The method as recited in claim 2, wherein the second image comprises a user interface.

19. The method as recited in claim 2, wherein the first image is obtained from one or more of:
a web application;
a desktop application;

a webpage;
a text file;
a television application;
an interface.

20. The method as recited in claim 2,
wherein the third image comprises a video frame in a plurality of video frames;
wherein the plurality of video frames are encoded in the 3-dimensional display mode; and
wherein the second image is displayed concurrently with each video frame of the plurality of video frames in the 3-dimensional display mode.

21. An apparatus, comprising:
a computer readable storage medium that comprises encoded instructions; and
a processor, which when executing the instructions, performs or controls a process that comprises the steps of:
receiving a first image for display in a 3-dimensional display mode, wherein the first image is not encoded for the 3-dimensional display mode;
receiving a third image for display in the 3-dimensional display mode, wherein the third image is encoded for the 3-dimensional display mode, and where the third image comprises a set of side-by-side images further comprising a right view image and a left view image and further wherein the first image is to be merged with the third image to result in a 3-dimensional composite image;
detecting that the first image has not been encoded for the 3-dimensional display mode based on an analysis of the first image, wherein the detecting that the first image has not been encoded for the 3-dimensional mode comprises comparing two different portions of the first image and determining a degree of similarity between the two different portions of the first image;
detecting that the third image has been encoded for the 3-dimensional display mode based on an analysis of the third image, wherein the analysis of the third image generates 3-dimensional display mode information;
modifying the first image to generate a second image encoded for the 3-dimensional display mode, wherein the second image comprises a right view image and a left view image that, when composed with the third image, renders a 3-dimensional image substantially depicting the 2-dimensional first image in 3-dimensions, and wherein the modifying the first image to generate the second image is responsive to the detecting that the first image has not been encoded for the 3-dimensional display mode and is based on the 3-dimensional display mode information; and
displaying the second image in the 3-dimensional display mode.

22. A non-transitory computer readable storage medium, comprising software instructions, which when executed by one or more processors, cause or control performance of a process that comprises the steps of:
receiving a first image for display in a 3-dimensional display mode, wherein the first image is not encoded for the 3-dimensional display mode;
receiving a third image for display in the 3-dimensional display mode, wherein the third image is encoded for the 3-dimensional display mode;
detecting that the first image has not been encoded for the 3-dimensional display mode based on an analysis of the first image, wherein the detecting that the first image has not been encoded for the 3-dimensional mode comprises comparing two different portions of the first image and determining a degree of similarity between the two different portions of the first image;
detecting that the third image has been encoded for the 3-dimensional display mode based on an analysis of the third image, wherein the analysis of the third image generates 3-dimensional display mode information;
modifying the first image to generate a second image encoded for the 3-dimensional display mode, wherein the second image comprises a right view image and a left view image that, when composed with the third image, renders a 3-dimensional image substantially depicting the 2-dimensional first image in 3-dimensions, and wherein the modifying the first image to generate the second image is responsive to the detecting that the first image has not been encoded for the 3-dimensional display mode and is based on the 3-dimensional display mode information; and
displaying the second image in the 3-dimensional display mode.

23. A system, comprising:
means for receiving a first image for display in a 3-dimensional display mode, wherein the first image is not encoded for the 3-dimensional display mode;
means for receiving a third image for display in the 3-dimensional display mode, wherein the third image is encoded for the 3-dimensional display mode, and where the third image comprises a set of side-by-side images further comprising a right view image and a left view image and further wherein the first image is to be merged with the third image to result in a 3-dimensional composite image;
means for detecting that the first image has not been encoded for the 3-dimensional display mode based on an analysis of the first image, wherein the detecting that the first image has not been encoded for the 3-dimensional mode comprises comparing two different portions of the first image and determining a degree of similarity between the two different portions of the first image;
means for detecting that the third image has been encoded for the 3-dimensional display mode based on an analysis of the third image, wherein the analysis of the third image generates 3-dimensional display mode information;
means for modifying the first image to generate a second image encoded for the 3-dimensional display mode, wherein the second image comprises a right view image and a left view image that, when composed with the third image, renders a 3-dimensional image substantially depicting the 2-dimensional first image in 3-dimensions, and wherein the modifying the first image to generate the second image is responsive to the detecting that the first image has not been encoded for the 3-dimensional display mode and is based on the 3-dimensional display mode information; and
means for displaying the second image in the 3-dimensional display mode.

* * * * *